US009491621B2

(12) United States Patent
Cherian et al.

(10) Patent No.: US 9,491,621 B2
(45) Date of Patent: Nov. 8, 2016

(54) SYSTEMS AND METHODS FOR FAST INITIAL LINK SETUP SECURITY OPTIMIZATIONS FOR PSK AND SAE SECURITY MODES

(71) Applicant: QUALCOMM Incorporated, San Diego, CA (US)

(72) Inventors: George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 14/481,547

(22) Filed: Sep. 9, 2014

(65) Prior Publication Data

US 2015/0071443 A1 Mar. 12, 2015

Related U.S. Application Data

(60) Provisional application No. 61/876,165, filed on Sep. 10, 2013.

(51) Int. Cl.
| | | |
|---|---|---|
| *H04K 1/00* | (2006.01) | |
| *H04W 12/06* | (2009.01) | |
| *H04L 29/06* | (2006.01) | |
| *H04W 12/04* | (2009.01) | |
| *H04W 84/12* | (2009.01) | |

(52) U.S. Cl.
CPC .............. *H04W 12/06* (2013.01); *H04L 63/06* (2013.01); *H04L 63/08* (2013.01); *H04W 12/04* (2013.01); *H04L 2463/061* (2013.01); *H04W 84/12* (2013.01)

(58) Field of Classification Search
CPC .... H04W 12/06; H04W 12/04; H04L 63/06; H04L 63/08
See application file for complete search history.

(56) References Cited

U.S. PATENT DOCUMENTS

| | | | | |
|---|---|---|---|---|
| 8,126,145 | B1* | 2/2012 | Tewari ................. | H04L 9/0841 370/401 |
| 2010/0246818 | A1* | 9/2010 | Yao ....................... | H04L 9/3273 380/44 |
| 2012/0036560 | A1* | 2/2012 | Wang .................... | H04W 12/06 726/4 |

(Continued)

OTHER PUBLICATIONS

International Search Report and Written Opinion—PCT/US2014/054982—ISA/EPO—Nov. 21, 2014.

(Continued)

*Primary Examiner* — Techane Gergiso
(74) *Attorney, Agent, or Firm* — Knobbe, Martens, Olson & Bear, LLP

(57) ABSTRACT

Systems, methods, and devices for communicating data in a wireless communications network are described herein. In some aspects, an access point transmits a beacon to a station. The beacon comprises a Wi-Fi Protected Access II pre-sharked key (WPA2-PSK) authentication type. The access point further receives an authentication request from the station. The access point further transmits an authentication response to the station. The authentication response comprises the WPA2-PSK authentication type. The access point further retrieves a PSK and generates a PMK based on the PSK. The access point further receives an association request from the station after generation of the PMK. The association request comprises a key confirmation derived from the PSK. The access point further transmits an association response to the station in response to reception of the association request. The association response comprises the key confirmation.

22 Claims, 8 Drawing Sheets

(56) References Cited

U.S. PATENT DOCUMENTS

| | | | |
|---|---|---|---|
| 2013/0095789 A1* | 4/2013 | Keevill | H04W 12/06 455/411 |
| 2013/0176897 A1 | 7/2013 | Wang et al. | |
| 2013/0286889 A1* | 10/2013 | Cherian | H04L 63/18 370/254 |
| 2015/0230280 A1* | 8/2015 | Dees | H04W 76/023 455/39 |
| 2015/0271667 A1* | 9/2015 | Bernsen | H04L 63/06 713/171 |

OTHER PUBLICATIONS

Wang L., "Proposal for an Accelerated Link Setup Procedure, 11-12-0010-01-00ai-proposal-for-an-accelerated-link-setup-procedure", IEEE SA Mentor; 11-12-0010-01-00AI-Proposal-For-An-Accelerated-Link-Setup-Procedure, IEEE-SA Mentor, Piscataway, NJ USA, vol. 802.11ai, No. 1, Jan. 16, 2012 (Jan. 16, 2012), pp. 1-16, XP068038047.

* cited by examiner

SYSTEMS AND METHODS FOR FAST INITIAL LINK SETUP SECURITY OPTIMIZATIONS FOR PSK AND SAE SECURITY MODES

CROSS-REFERENCE TO RELATED APPLICATIONS

This application claims priority under 35 U.S.C. §119(e) to U.S. Provisional Application No. 61/876,165, entitled "SYSTEMS AND METHODS FOR FAST INITIAL LINK SETUP SECURITY OPTIMIZATIONS FOR PSK & SAE SECURITY MODES" and filed on Sep. 10, 2013, which is hereby incorporated by reference in its entirety.

BACKGROUND

1. Field

The present application relates generally to wireless communication systems and more specifically to systems, methods, and devices for fast initial network link setup within wireless communication systems.

2. Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or when the network architecture is formed in an ad hoc, rather than fixed, topology. A mobile network element such as a wireless station (STA) and an access point (AP) can exchange messages through a process of link setup for utilizing the network. Under certain conditions, many STAs can attempt to use the network during a short period of time. For example, when several STAs move into the vicinity of a new network, the network can experience an increased rate of link setup process collisions creating undesirable latencies in the link setup. Accordingly, there is a need for a fast initial link setup in a wireless communication network.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of this disclosure provides a method for communicating data in a wireless communications network. The method comprises transmitting a beacon to a station. The beacon may comprise a Wi-Fi Protected Access II pre-sharked key (WPA2-PSK) authentication type. The method further comprises receiving an authentication request from the station. The authentication request may comprise the WPA2-PSK authentication type. The method further comprises transmitting an authentication response to the station. The authentication response may comprise the WPA2-PSK authentication type. The method further comprises retrieving a pre-shared key (PSK). The method further comprises generating a pairwise master key (PMK) based on the PSK. The method further comprises receiving an association request from the station after generation of the PMK. The association request may comprise a key confirmation derived from the PSK. The method further comprises transmitting an association response to the station in response to receiving the association request. The association response may comprise the key confirmation.

Another aspect of this disclosure provides an apparatus for communicating data in a wireless communications network. The apparatus comprises a transmitter configured to transmit a beacon to a station. The beacon may comprise a Wi-Fi Protected Access II pre-sharked key (WPA2-PSK) authentication type. The apparatus further comprises a receiver configured to receive an authentication request from the station. The authentication request may comprise the WPA2-PSK authentication type. The transmitter may be further configured to transmit an authentication response to the station. The authentication response may comprise the WPA2-PSK authentication type. The apparatus further comprises a processor configured to retrieve a pre-shared key (PSK). The processor may be further configured to generate a pairwise master key (PMK) based on the PSK. The receiver may be further configured to receive an association request from the station after generation of the PMK. The association request may comprise a key confirmation derived from the PSK. The transmitter may be further configured to transmit an association response to the station in response to reception of the association request. The association response may comprise the key confirmation.

Another aspect of this disclosure provides a method for communicating data in a wireless communications network. The method comprises transmitting a beacon to a station. The beacon may comprise a Wi-Fi Protected Access II pre-sharked key (WPA2-PSK) authentication type. The method further comprises receiving an authentication request from the station. The authentication request may comprise the WPA2-PSK authentication type, a first secure attribute exchange (SAE) information element, and a station nonce. The method further comprises transmitting an authentication response to the station. The authentication response may comprise the WPA2-PSK authentication type, the first SAE information element, and an access point nonce. The method further comprises generating a pairwise master key (PMK) identifier based on the first SAE information element. The method further comprises receiving an association request from the station after generation of the PMK identifier. The association request may comprise a key confirmation derived from the PMK identifier and a second SAE information element. The method further comprises transmitting an association response to the station in response to receiving the association request. The association response may comprise the key confirmation and the second SAE information element.

Another aspect of this disclosure provides an apparatus for communicating data in a wireless communications network. The apparatus comprises a transmitter configured to transmit a beacon to a station. The beacon may comprise a Wi-Fi Protected Access II pre-sharked key (WPA2-PSK) authentication type. The apparatus further comprises a receiver configured to receive an authentication request from the station. The authentication request may comprise the WPA2-PSK authentication type, a first secure attribute exchange (SAE) information element, and a station nonce. The transmitter may be further configured to transmit an authentication response to the station. The authentication response may comprise the WPA2-PSK authentication type, the first SAE information element, and an access point. The apparatus further comprises a processor configured to generate a pairwise master key (PMK) identifier based on the first SAE information element. The receiver may be further configured to receive an association request from the station after generation of the PMK identifier. The association request may comprise a key confirmation derived from the PMK identifier and a second SAE information element. The transmitter may be further configured to transmit an association response to the station in response to reception of the association request. The association response may comprise the key confirmation and the second SAE information element.

DETAILED DESCRIPTION

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
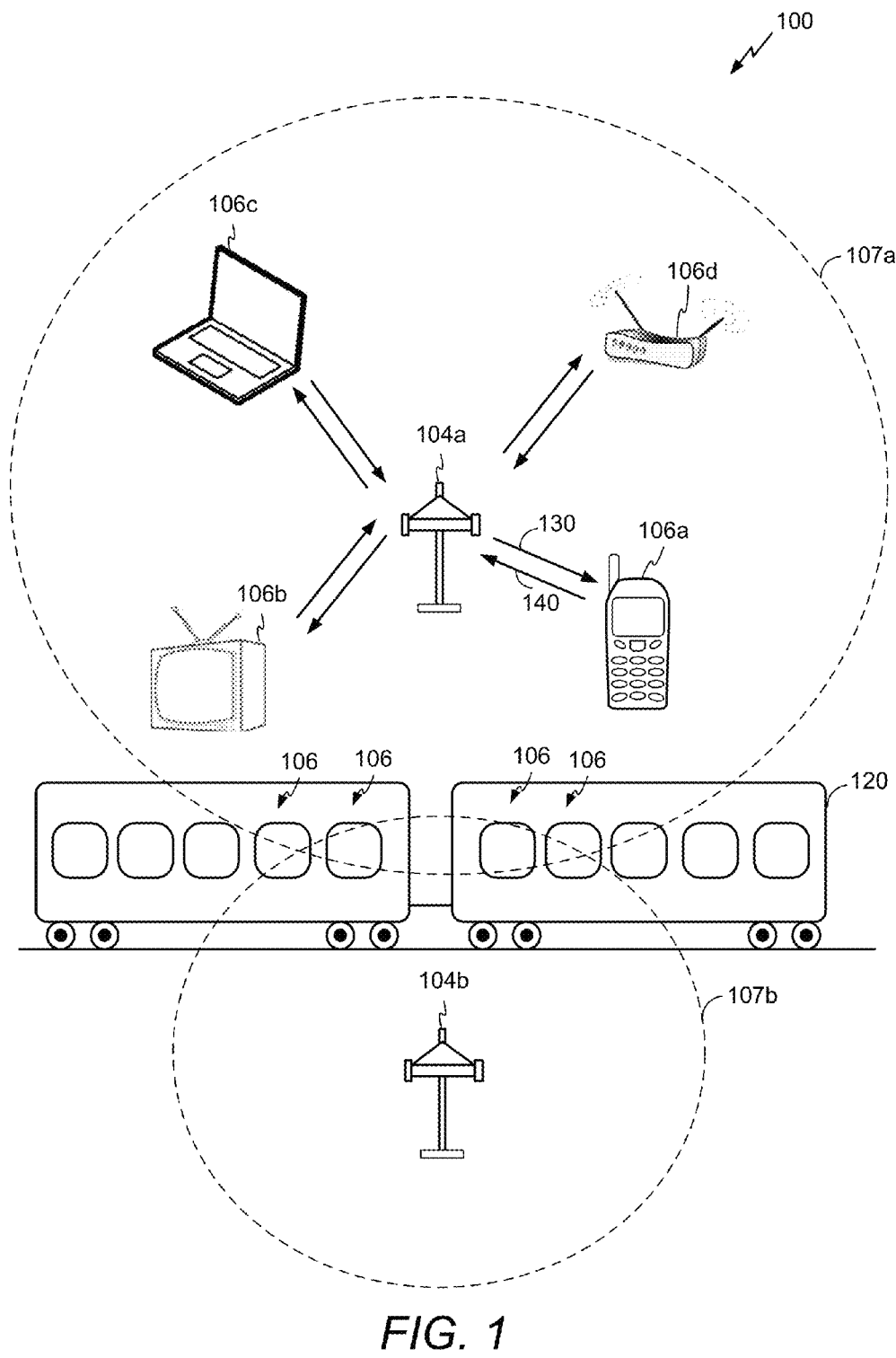
FIG. 1 shows an exemplary wireless communication system in which aspects of the present disclosure can be employed.

FIG. 1 shows an exemplary wireless communication system 100 in which aspects of the present disclosure can be employed. The wireless communication system 100 includes an access point (AP) 104a, which communicates with a plurality of stations (STAs) 106a-106d in a basic service area (BSA) 107a. The wireless communication system 100 can further include a second AP 104b which can communicate in a BSA 107b. One or more STAs 106 can move in and/or out of the BSAs 107a-107b, for example, via a train 120. In various embodiments described herein, the STAs 106 and 106a-106d can be configured to quickly establish wireless links with the AP 104a and/or 104b, particularly when moving into the BSAs 107a and/or 107b.

The various fast initial link setup (FILS) authentication implementations described herein can provide enhanced system performance under a variety of use conditions and may be compatible with existing enterprise authentication schemes. In some embodiments, when a large number of STAs 106 move into range of an AP 104a and/or 104b, they can create a large amount of wireless traffic, for example, in an attempt to establish a wireless link with the AP 104a. In some instances, the STAs 106 can generate hundreds of connection attempts per second. A high number of STAs 106 requesting access can cause packet collisions and/or dropping of packets, thereby potentially reducing network performance and increasing latency. The increased latency may cause STAs 106 to remain idle for longer periods of time, thereby increasing power consumption. Accordingly, a fast initial link setup (FILS) can utilize techniques for allowing STAs 106 to enter a sleep state (e.g., an inactive state, a state in which some or all of the components of the STAs 106 are powered down to reduce power consumption, etc.) during the connection process to reduce power consumption. Thus, FILS optimizes the association of STAs 106 to APs 104 and the assignment of IP addresses by APs 104 to STAs 106.

However, current FILS-based wireless communication systems may not be compatible with the authentication schemes used by enterprises. For example, conventional FILS-based wireless communication systems use IEEE 802.1x based authentication. IEEE 802.1x based authentication, for example, requires the use of an authentication server in the wireless communication system. Generally, in IEEE 802.1x protocols, authentication takes place between a STA and the authentication server (e.g., a server that provides authentication services, such as identity verification, authorization, privacy, and non-repudiation). As an example, the AP, which functions as an authenticator, relays messages between the AP and the authentication server during the authentication process. In some instances, the authentication messages between the STA and the AP are transported using extensible authentication protocol over local area network (EAPOL) frames. EAPOL frames may be defined in the IEEE 802.11i protocol. The authentication messages between the AP and the authentication server may be transported using the remote authentication dial in user service (RADIUS) protocol or the Diameter authentication, authorization, and accounting protocol.

On the other hand, many enterprises still use pre-shared key (PSK) based authentication or secure attribute exchange (SAE) based authentication, which do not require the use of an authentication server. The use of PSK or SAE based authentication does not add much delay to the authentication process, but enterprises may nonetheless desire the benefits associated with FILS-based wireless communication systems described above. Accordingly, to minimize the costs associated with changing authentication schemes, it may be beneficial to develop a FILS-based wireless communication system that utilizes PSK or SAE based authentication. As described in greater detail herein, the devices 106 and 104a-104b can implement various techniques to perform PSK or SAE based authentication while achieving the benefits associated with FILS.

In various embodiments, the wireless communication system 100 can include a wireless local area network (WLAN). The WLAN can be used to interconnect nearby devices, employing one or more networking protocols. The various aspects described herein can apply to any communication standard, such as IEEE 802.11 wireless protocols. For example, the various aspects described herein can be used as part of the IEEE 802.11a, 802.11b, 802.11g, 802.11n, 802.11ah, and/or 802.11ai protocols. Implementations of the 802.11 protocols can be used for sensors, home automation, personal healthcare networks, surveillance networks, metering, smart grid networks, intra- and inter-vehicle communication, emergency coordination networks, cellular (e.g., 3G/4G) network offload, short- and/or long-range Internet access (e.g., for use with hotspots), machine-to-machine (M2M) communications, etc.

The APs 104a-104b can serve as a hub or base station for the wireless communication system 100. For example, the AP 104a can provide wireless communication coverage in the BSA 107a, and the AP 104b can provide wireless communication coverage in the BSA 107b. The AP 104a and/or 104b can include, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

The STAs 106 and 106a-106d (collectively referred to herein as STAs 106) can include a variety of devices such as, for example, laptop computers, personal digital assistants (PDAs), mobile phones, etc. The STAs 106 can connect to, or associate with, the APs 104a-104b via a WiFi (e.g., IEEE 802.11 protocol such as 802.11ai) compliant wireless link to obtain general connectivity to the Internet or to other wide area networks. The STAs 106 may also be referred to as "clients."

In various embodiments, the STAs 106 can include, be implemented as, or be known as access terminals (ATs), subscriber stations, subscriber units, mobile stations, remote stations, remote terminals, user terminals (UTs), terminals, user agents, user devices, user equipment (UEs), or some other terminology. In some implementations, a STA 106 can include a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The AP 104a, along with the STAs 106a-106d associated with the AP 104a, and that are configured to use the AP 104a for communication, can be referred to as a basic service set (BSS). In some embodiments, the wireless communication system 100 may not have a central AP 104a. For example, in some embodiments, the wireless communication system 100 can function as a peer-to-peer network between the STAs 106. Accordingly, the functions of the AP 104a described herein can alternatively be performed by one or more of the STAs 106. Moreover the AP 104a can implement one or more aspects described with respect to the STAs 106, in some embodiments.

A communication link that facilitates transmission from the AP 104a to one or more of the STAs 106 can be referred to as a downlink (DL) 130, and a communication link that facilitates transmission from one or more of the STAs 106 to the AP 104a can be referred to as an uplink (UL) 140. Alternatively, a downlink 130 can be referred to as a forward link or a forward channel, and an uplink 140 can be referred to as a reverse link or a reverse channel.

A variety of processes and methods can be used for transmissions in the wireless communication system 100 between the AP 104a and the STAs 106. In some aspects, wireless signals can be transmitted using orthogonal frequency-division multiplexing (OFDM), direct-sequence spread spectrum (DSSS) communications, a combination of OFDM and DSSS communications, or other schemes. For example, signals can be sent and received between the AP 104a and the STAs 106 in accordance with OFDM/OFDMA processes. Accordingly, the wireless communication system 100 can be referred to as an OFDM/OFDMA system. As another example, signals can be sent and received between the AP 104a and the STAs 106 in accordance with CDMA processes. Accordingly, the wireless communication system 100 can be referred to as a CDMA system.

Aspects of certain devices (such as the AP 104a and the STAs 106) implementing such protocols can consume less power than devices implementing other wireless protocols. The devices can be used to transmit wireless signals across a relatively long range, for example about one kilometer or longer. As described in greater detail herein, in some embodiments, devices can be configured to establish wireless links faster than devices implementing other wireless protocols.

PSK Based Authentication

Figure 2:
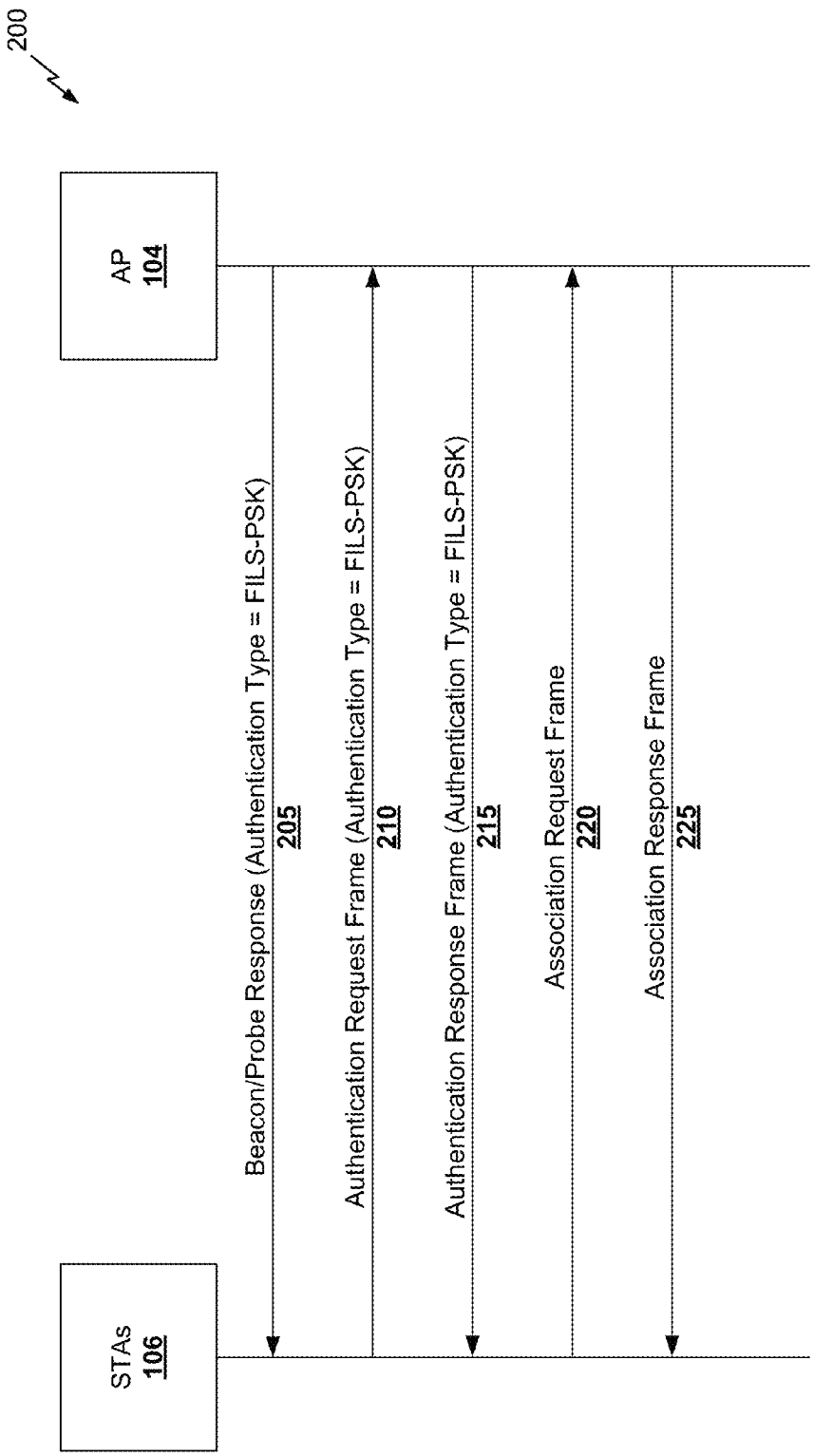
FIG. 2 shows a communication exchange for initial link setup with fast initial link setup pre-shared key (FILS-PSK) authentication in the wireless communication system of FIG. 1.

FIG. 2 shows a communication exchange 200 in a FILS wireless communication system with PSK based authentication. Signaling is shown, according to various embodiments, between one or more STAs 106 and 106a-106d and one or more APs 104a-104b during authentication and association in an IEEE 802.11ai network.

As illustrated in FIG. 2, the AP 104 transmits a beacon/probe response 205 to the STA 106. The beacon/probe response 205 may include an indication of the authentication type, which is fast initial link setup pre-shared key (FILS- PSK) in this case. The beacon/probe response 205 may be periodically transmitted by the AP 104.

Based on receiving the beacon/probe response 205, the STA 106 may transmit an authentication request frame 210 to the AP 104. The authentication request frame 210 may include a STA nonce (Snonce) and an indication of the authentication type, which again is FILS-PSK in this case.

In response to receiving the authentication request frame 210, the AP 104 may transmit an authentication response frame 215 to the STA 106. The authentication response frame 215 may include an AP nonce (Anonce) and an indication of the authentication type, which again is FILS-PSK in this case.

After transmitting the authentication response frame 215, the AP 104 may generate a pairwise master key (PMK) by retrieving a pre-shared key (PSK). The AP 104 may set the PMK to be equal to the PSK. The PMK is a key that is used to encrypt (and decrypt) traffic. In some embodiments, the PMK is pre-set by the AP 104 and distributed to the STAs 106. In other embodiments, the PMK is pre-set separately by the AP 104 and the STAs 106.

Likewise, after receiving the authentication response frame 215, the STA 106 may generate a PMK by retrieving the PSK. The STA 106 may set the PMK to be equal to the PSK.

After the PMK is set, the STA 106 may transmit an association request frame 220 to the AP 104. The association request frame 220 may include a key confirmation and a request for an IP address. The key confirmation may be derived from the PSK. The key confirmation may be used by the AP 104 to verify that the AP 104 and the STA 106 possess the same PSK.

After receiving the association request frame 220, the AP 104 may transmit an association response frame 225 to the STA 106. The association response frame 225 may include a key confirmation and a response to the IP address request (e.g., an assigned IP address). Like as described above, the key confirmation may be derived from the PSK.

SAE Based Authentication

Figure 3:
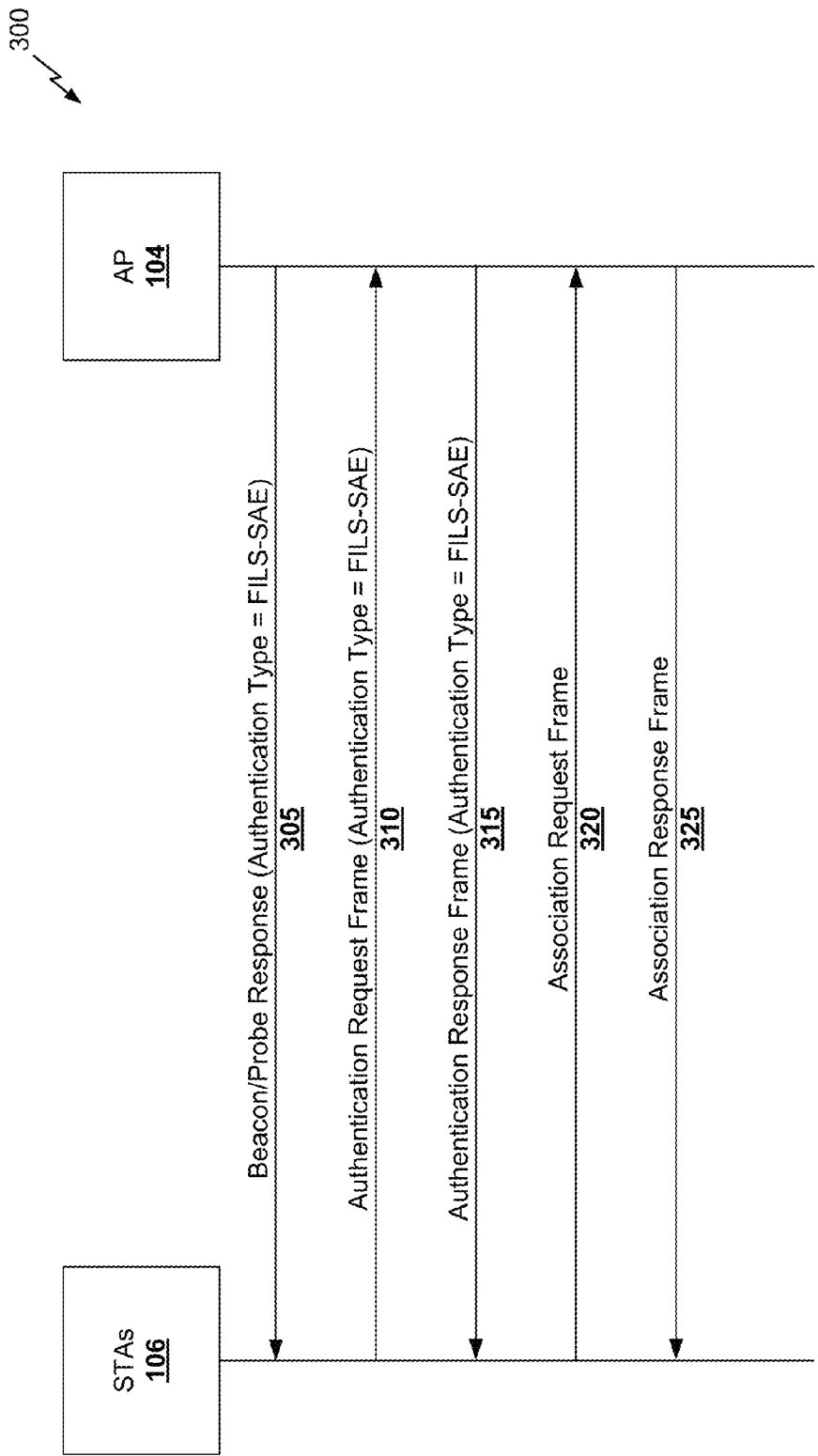
FIG. 3 shows a communication exchange for initial link setup with fast initial link setup secure attribute exchange (FILS-SAE) authentication in the wireless communication system of FIG. 1.

FIG. 3 shows a communication exchange 300 in a FILS wireless communication system with SAE based authentication. Signaling is shown, according to various embodiments, between one or more STAs 106 and 106a-106d and one or more APs 104a-104b during authentication and association in an IEEE 802.11ai network.

As illustrated in FIG. 3, the AP 104 transmits a beacon/probe response 305 to the STA 106. The beacon/probe response 305 may include an indication of the authentication type, which is fast initial link setup secure attribute exchange (FILS-SAE) in this case. The beacon/probe response 305 may be periodically transmitted by the AP 104.

Based on receiving the beacon/probe response 305, the STA 106 may transmit an authentication request frame 310 to the AP 104. The authentication request frame 310 may include an Snonce, an indication of the authentication type, which again is FILS-SAE in this case, and an information element (IE). In an embodiment, the IE is a SAE-COMMIT IE. The SAE-COMMIT IE may be a hash of a key used to encrypt and/or decrypt transmissions.

In response to receiving the authentication request frame 310, the AP 104 may transmit an authentication response frame 315 to the STA 106. The authentication response frame 315 may include an Anonce, an indication of the authentication type, which again is FILS-SAE in this case, and an IE. In an embodiment, the IE is the SAE-COMMIT IE.

After transmitting the authentication response frame 315, the AP 104 may generate a pairwise master key identifier (PMKID). The PMKID may be derived based on the SAE-COMMIT IE. In an embodiment, the PMKID is set based on the protocols defined in the IEEE 802.11 standard. In some embodiments, the PMKID is pre-set by the AP 104 and distributed to the STAs 106. In other embodiments, the PMKID is pre-set separately by the AP 104 and the STAs 106.

Likewise, after receiving the authentication response frame 315, the STA 106 may generate a PMKID in the same manner as the AP 104.

After the PMKID is set, the STA 106 may transmit an association request frame 320 to the AP 104. The association request frame 320 may include a key confirmation, a request for an IP address, and another IE. The key confirmation may be derived from the PMKID, the Snonce, the Anonce, and/or medium access control (MAC) addresses of the STA 106 and/or the AP 104. The key confirmation may be used by the AP 104 to verify that the AP 104 and the STA 106 possess the same key. The IE in the association request frame 320 may be a SAE-CONFIRM IE.

After receiving the association request frame 320, the AP 104 may transmit an association response frame 325 to the STA 106. The association response frame 325 may include a key confirmation, a response to the IP address request (e.g., an assigned IP address), and another IE. Like as described above, the key confirmation may be derived from the PMKID, the Snonce, the Anonce, and/or medium access control (MAC) addresses of the STA 106 and/or the AP 104. The IE in the association response frame 325 may be the SAE-CONFIRM IE.

Components of an AP and/or STA

Figure 4:
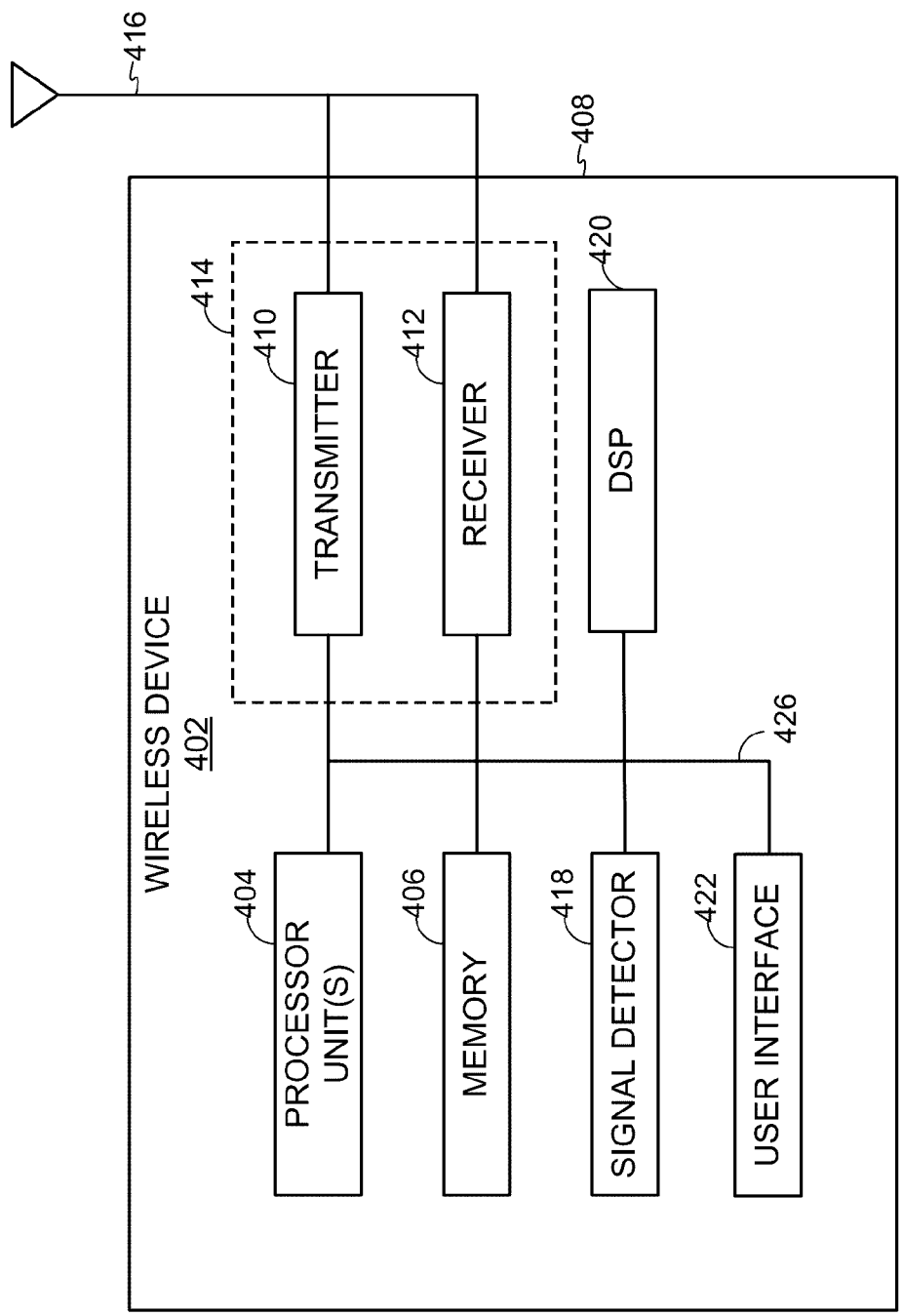
FIG. 4 shows a functional block diagram of an exemplary a wireless device that can be employed within the wireless communication system of FIG. 1.

FIG. 4 shows a functional block diagram of an exemplary a wireless device 402 that can be employed within the wireless communication system 100 of FIG. 1. The wireless device 402 is an example of a device that can be configured to implement the various methods described herein. For example, the wireless device 402 can include the AP 104 and/or one of the STAs 106.

The wireless device 402 can include one or more processor units 404 which are configured to control operation of the wireless device 402. One or more of the processor units 404 can be collectively referred to as a central processing unit (CPU). A memory 406, which can include both read-only memory (ROM) and random access memory (RAM), provides instructions and data to the processor units 404. A portion of the memory 406 can also include non-volatile random access memory (NVRAM). The processor units 404 can be configured to perform logical and arithmetic operations based on program instructions stored within the memory 406. The processor 404 can be configured to implement one or more methods described herein, for example in conjunction with executable instructions in the memory 406.

When the wireless device 402 is implemented or used as an AP, the processor 404 can be configured to expedite the discovery of the AP by a STA and the creation of a link with a STA. The processor 404 can be further configured to reduce contention for AP resources. For example, a high volume of STAs requesting access can cause packet collisions or dropping of packets. Various processes to expedite connection and improve resource utilization are described in further detail herein.

When the wireless device 402 is implemented or used as a STA, the processor units 404 can be configured to expedite the discovery of an AP and the creation of a link with the AP.

The processor units 404 can be further configured to reduce contention for AP resources. For example, through passive listening, a STA can acquire the information needed to establish a link with an AP without directly requesting the information from the AP. This and various other processes to expedite connection and improve resource utilization are described in further detail below.

The processor units 404 can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor units 404 include a DSP, the DSP can be configured to generate a packet (e.g., a data packet) for transmission. In some aspects, the packet can include a physical layer data unit (PPDU).

The wireless device 402 can also include machine-readable media for storing software. The processing units 404 can include one or more machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the processor units 404, cause the wireless device 402 to perform the various functions described herein.

The wireless device 402 can include a transmitter 410 and/or a receiver 412 to allow transmission and reception, respectively, of data between the wireless device 402 and a remote location. The transmitter 410 and receiver 412 can be combined into a transceiver 414. An antenna 416 can be attached to the housing 408 and electrically coupled with the transceiver 414. The wireless device 402 can also include (not shown) multiple transmitters, multiple receivers, multiple transceivers, and/or multiple antennas.

The transmitter 410 can be configured to wirelessly transmit packets and/or signals. For example, the transmitter 410 can be configured to transmit different types of packets generated by the processor units 404, discussed above. The packets are made available to the transmitter 410. For example, the processor units 404 can store a packet in the memory 406 and the transmitter 410 can be configured to retrieve the packet. Once the transmitter retrieves the packet, the transmitter 410 transmits the packet to a STA 106 wireless device 402 via the antenna 416.

An antenna 416 on the STA 106 wireless device 402 detects wirelessly transmitted packets/signals. The STA 106 receiver 412 can be configured to process the detected packets/signals and make them available to the processor units 404. For example, the STA 106 receiver 412 can store the packet in memory 406 and the processor units 404 can be configured to retrieve the packet.

The wireless device 402 can also include a signal detector 418 that can be used in an effort to detect and quantify the level of signals received by the transceiver 414. The signal detector 418 can detect such signals as total energy, energy per subcarrier per symbol, power spectral density, and other signals. The wireless device 402 can also include a digital signal processor (DSP) 420 for use in processing signals. The DSP 420 can be configured to generate a packet for transmission. In some aspects, the packet can include a physical layer data unit (PPDU).

The wireless device 402 can further include a user interface 422 in some aspects. The user interface 422 can include a keypad, a microphone, a speaker, and/or a display. The user interface 422 can include any element or component that conveys information to a user of the wireless device 402 and/or receives input from the user. The wireless device 402 can also include a housing 408 surrounding one or more of the components included in the wireless device 402.

The various components of the wireless device 402 can be coupled together by a bus system 426. The bus system 426 can include a data bus, for example, as well as a power bus, a control signal bus, and a status signal bus in addition to the data bus. Those of skill in the art will appreciate the components of the wireless device 402 can be coupled together or accept or provide inputs to each other using some other mechanism.

Although a number of separate components are illustrated in FIG. 4, those of skill in the art will recognize that one or more of the components can be combined or commonly implemented. For example, the processor units 404 can be used to implement not only the functionality described above with respect to the processor units 404, but also to implement the functionality described above with respect to the signal detector 418. Further, each of the components illustrated in FIG. 4 can be implemented using a plurality of separate elements.

Flowcharts

Figure 5:
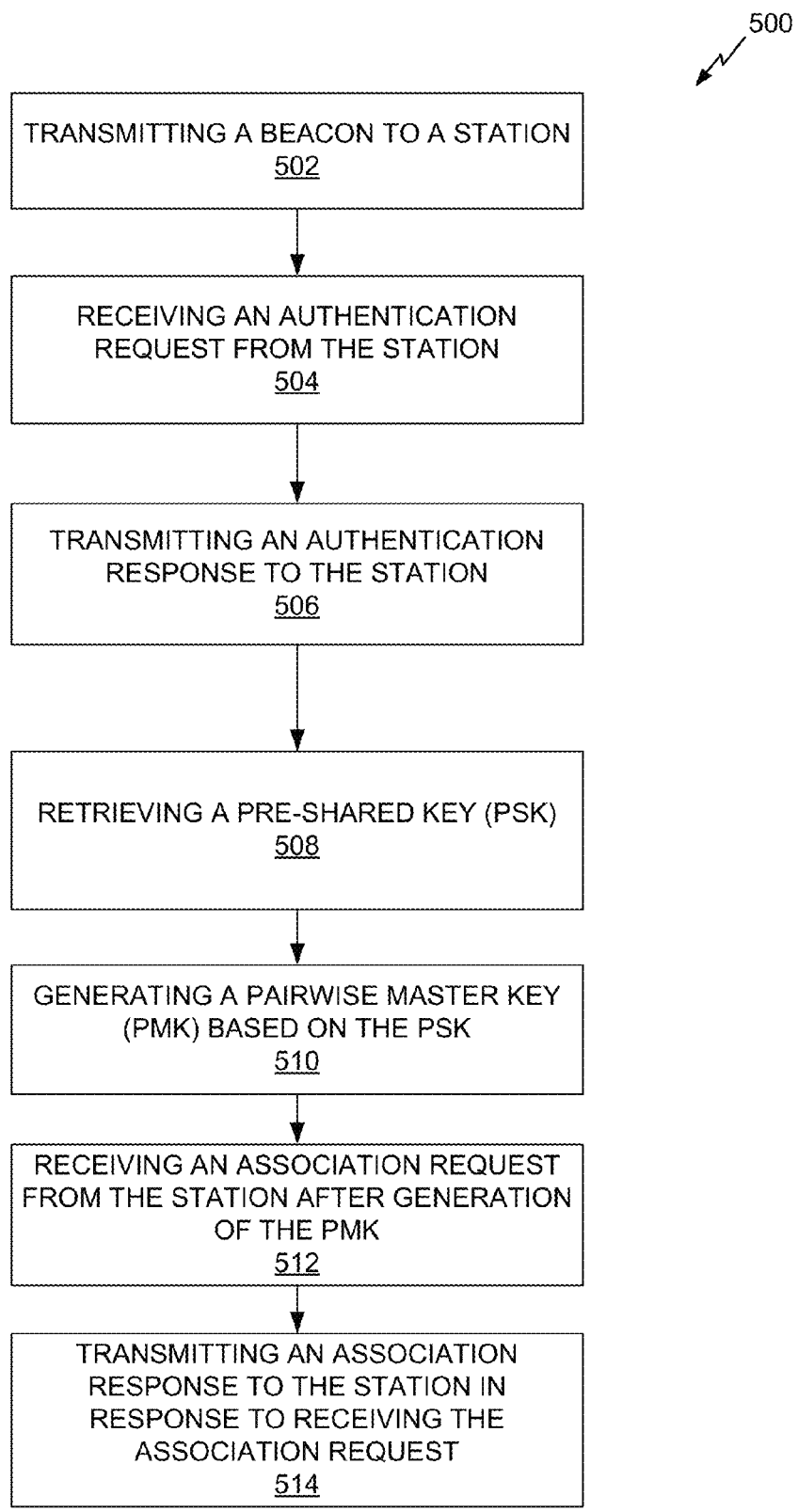
FIG. 5 is a flowchart of a process for communicating data in the wireless communications system of FIG. 1.

FIG. 5 is a flowchart of a process 500 for communicating data in the wireless communications system of FIG. 1. In an embodiment, the process 500 may be performed by an AP, such as the AP 104. At block 502, the process 500 transmits a beacon to a STA. In an embodiment, the beacon comprises an authentication type. In a further embodiment, the authentication type comprises the FILS-PSK. At block 504, the process 500 receives an authentication request from the STA. In an embodiment, the authentication request comprises the authentication type. In a further embodiment, the authentication type comprises the FILS-PSK.

At block 506, the process 500 transmits an authentication response to the STA. In an embodiment, the authentication response comprises the authentication type. In a further embodiment, the authentication type comprises the FILS-PSK. At block 508, the process 500 retrieves a PSK.

At block 510, the process 500 generates a PMK based on the PSK. In an embodiment, the PMK is set to the PSK. At block 512, the process 500 receives an association request from the STA after generation of the PMK. In an embodiment, the association request comprises a key confirmation derived from the PSK. At block 514, the process 500 transmits an association response to the STA in response to receiving the association request. In an embodiment, the association response comprises the key confirmation derived from the PSK. After block 514, the process 500 ends.

Figure 6:
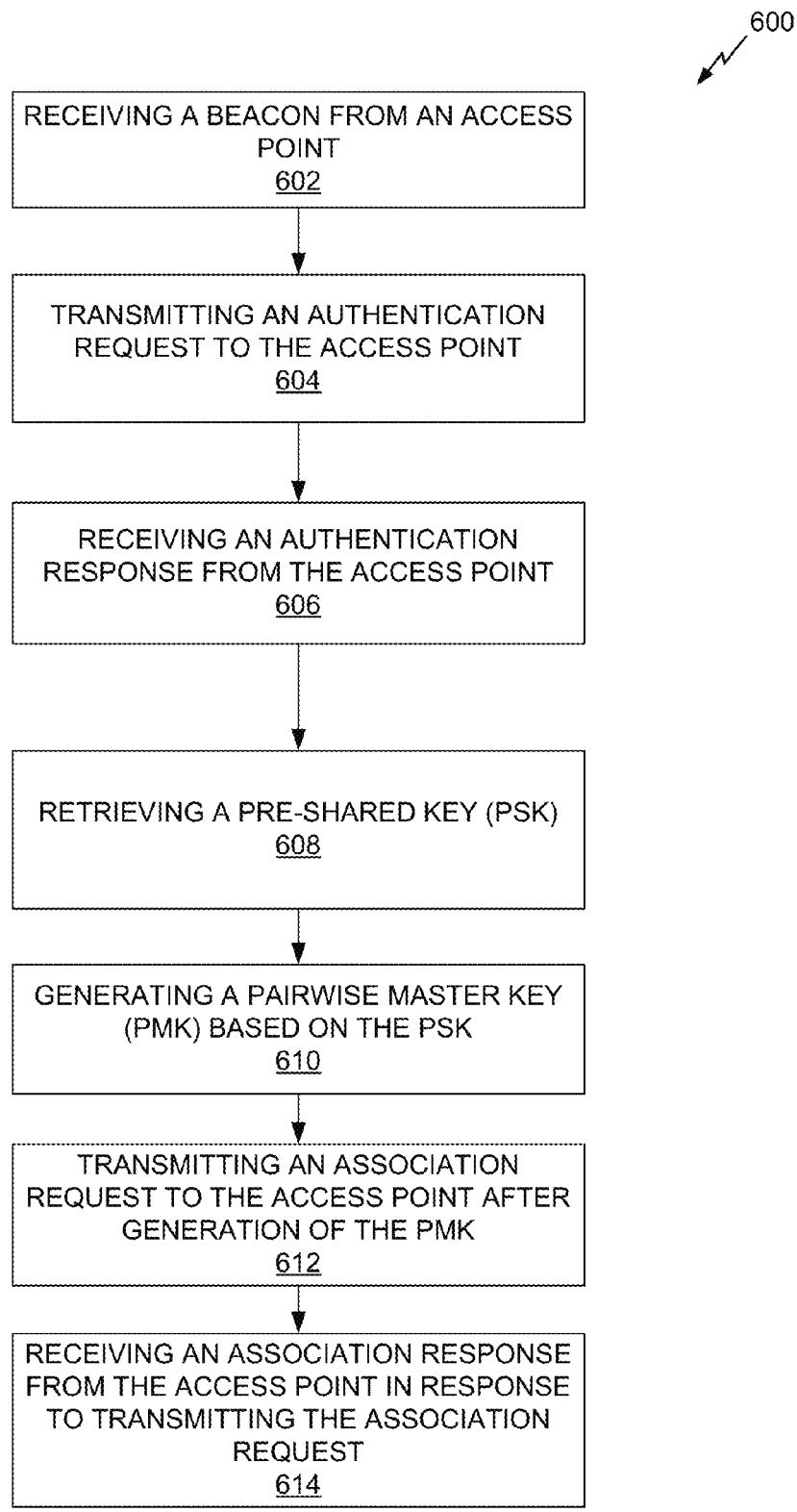
FIG. 6 is another flowchart of a process for communicating data in the wireless communications system of FIG. 1.

FIG. 6 is another flowchart of a process 600 for communicating data in the wireless communications system of FIG. 1. In an embodiment, the process 600 may be performed by a STA, such as the STA 106. At block 602, the process 600 receives a beacon from an AP. In an embodiment, the beacon comprises an authentication type. In a further embodiment, the authentication type comprises the FILS-PSK. At block 604, the process 600 transmits an authentication request to the AP. In an embodiment, the authentication request comprises the authentication type. In a further embodiment, the authentication type comprises the FILS-PSK.

At block 606, the process 600 receives an authentication response from the AP. In an embodiment, the authentication response comprises the authentication type. In a further embodiment, the authentication type comprises the FILS-PSK. At block 608, the process 600 retrieves a PMK.

At block 610, the process 600 generates a PMK based on the PSK. In an embodiment, the PMK is set to the PSK. At block 612, the process 600 transmits an association request to the AP after generation of the PMK. In an embodiment, the association request comprises a key confirmation derived from the PSK. At block 614, the process 600 receives an association response from the AP in response to transmitting the association request. In an embodiment, the association response comprises the key confirmation derived from the PSK. After block 614, the process 600 ends.

Figure 7:
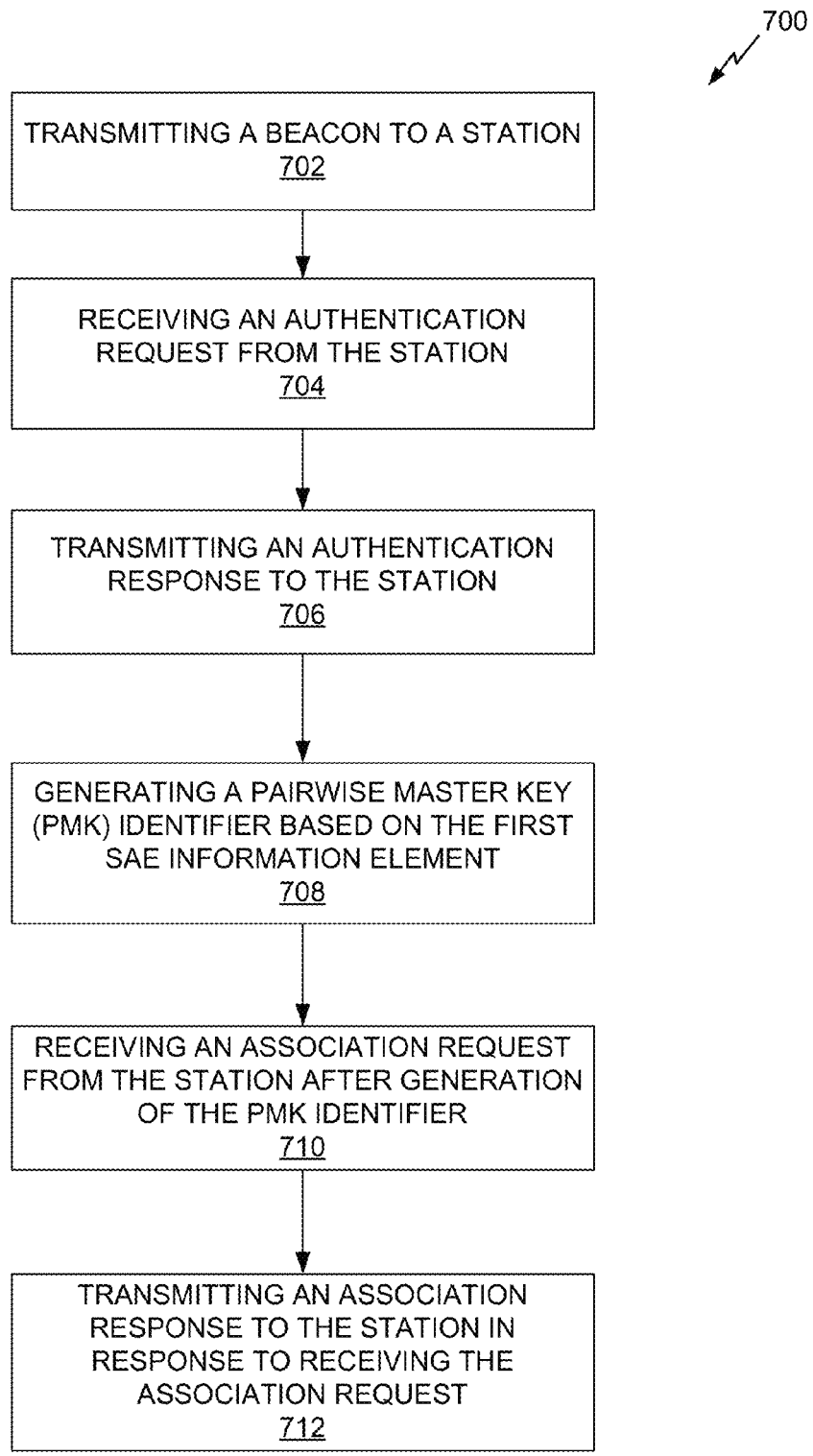
FIG. 7 is another flowchart of a process for communicating data in the wireless communications system of FIG. 1.

FIG. 7 is another flowchart of a process 700 for communicating data in the wireless communications system of FIG. 1. In an embodiment, the process 700 may be performed by an AP, such as the AP 104. At block 702, the process 700 transmits a beacon to a STA. In an embodiment, the beacon comprises an authentication type. In a further embodiment, the authentication type comprises the FILS-SAE. At block 704, the process 700 receives an authentication request from the STA. In an embodiment, the authentication request comprises the authentication type, a first SAE IE, and an Snonce. In a further embodiment, the authentication type comprises the FILS-SAE. In a further embodiment, the first SAE IE is the SAE-COMMIT IE.

At block 706, the process 700 transmits an authentication response to the STA. In an embodiment, the authentication response comprises the authentication type, the first SAE IE, and an Anonce. In a further embodiment, the authentication type comprises the FILS-PSK. In a further embodiment, the first SAE IE is the SAE-COMMIT IE.

At block 708, the process 700 generates a PMKID based on the first SAE IE. At block 710, the process 700 receives an association request from the STA after generation of the PMKID. In an embodiment, the association request comprises a key confirmation derived from the PMKID and a second SAE IE. In a further embodiment, the key confirmation is derived based on the PMKID, an Snonce, and Anonce, and/or MAC addresses of the AP and/or the STA. In a further embodiment, the second SAE IE is the SAE-CONFIRM IE.

At block 712, the process 700 transmits an association response to the STA in response to receiving the association request. In an embodiment, the association response comprises the key confirmation and the second SAE IE. In a further embodiment, the key confirmation is derived based on the PMKID, an Snonce, and Anonce, and/or MAC addresses of the AP and/or the STA. In a further embodiment, the second SAE IE is the SAE-CONFIRM IE. After block 712, the process 700 ends.

Figure 8:
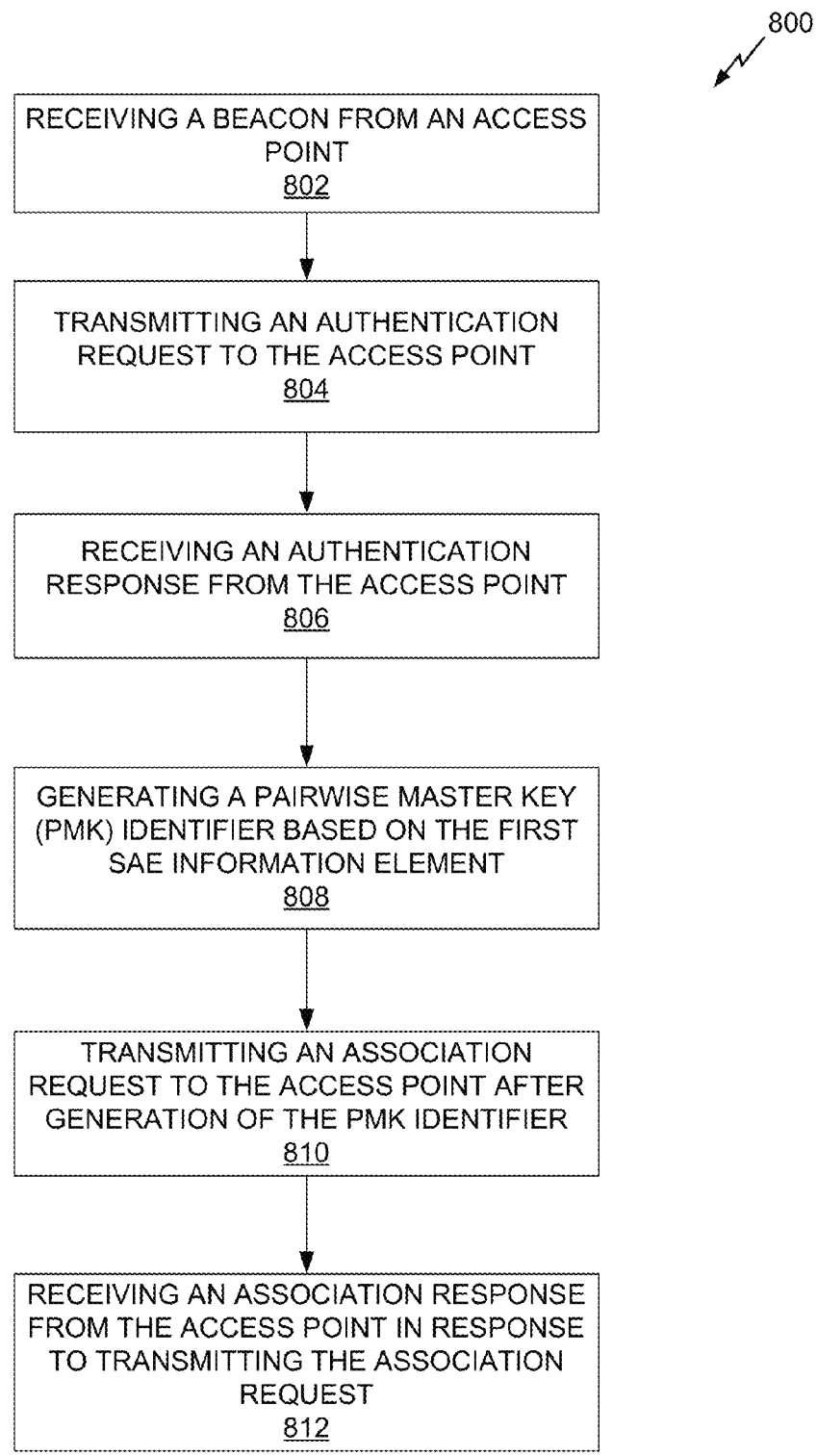
FIG. 8 is another flowchart of a process for communicating data in the wireless communications system of FIG. 1.

FIG. 8 is another flowchart of a process 800 for communicating data in the wireless communications system of FIG. 1. In an embodiment, the process 800 may be performed by a STA, such as the STA 106. At block 802, the process 800 receives a beacon from an AP. In an embodiment, the beacon comprises an authentication type. In a further embodiment, the authentication type comprises the FILS-SAE. At block 804, the process 800 transmits an authentication request to the AP. In an embodiment, the authentication request comprises the authentication type, a first SAE IE, and an Snonce. In a further embodiment, the authentication type comprises the FILS-SAE. In a further embodiment, the first SAE IE is the SAE-COMMIT IE.

At block 806, the process 800 receives an authentication response from the AP. In an embodiment, the authentication response comprises the authentication type, the first SAE IE, and an Anonce. In a further embodiment, the authentication type comprises the FILS-PSK. In a further embodiment, the first SAE IE is the SAE-COMMIT IE.

At block 808, the process 800 generates a PMKID based on the first SAE IE. At block 810, the process 800 transmits an association request to the AP after generation of the PMKID. In an embodiment, the association request comprises a key confirmation derived from the PMKID and a second SAE IE. In a further embodiment, the key confirmation is derived based on the PMKID, an Snonce, and Anonce, and/or MAC addresses of the AP and/or the STA. In a further embodiment, the second SAE IE is the SAE-CONFIRM IE.

At block 812, the process 800 receives an association response from the AP in response to transmitting the association request. In an embodiment, the association response comprises the key confirmation and the second SAE IE. In a further embodiment, the key confirmation is derived based on the PMKID, an Snonce, and Anonce, and/or MAC addresses of the AP and/or the STA. In a further embodiment, the second SAE IE is the SAE-CONFIRM IE. After block 812, the process 800 ends.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A non-transitory computer-readable medium comprising code that, when executed, causes an apparatus to:
   transmit a beacon to a station, the beacon comprising a Wi-Fi Protected Access II pre-shared key (WPA2-PSK) authentication type;
   receive an authentication request from the station, the authentication request comprising the WPA2-PSK authentication type and a first secure attribute exchange (SAE) information element;
   transmit an authentication response to the station, the authentication response comprising the WPA2-PSK authentication type and the first SAE information element;
   generate a pairwise master key (PMK) identifier based on the first SAE information element;
   receive an association request from the station after generation of the PMK identifier, the association request comprising a key confirmation derived from the PMK identifier and a second SAE information element; and
   transmit an association response to the station in response to receiving the association request, the association response comprising the key confirmation and the second SAE information element.

2. The medium of claim 1, the authentication request further comprising a station nonce.

3. The medium of claim 1, the authentication response further comprising an access point nonce.

4. The medium of claim 1, the association request further comprising an Internet Protocol (IP) address request.

5. The medium of claim 1, the association response further comprising an Internet Protocol (IP) address response.

6. The medium of claim 1, the WPA2-PSK authentication type comprising fast initial link setup secure attribute exchange (FILS-SAE).

7. An apparatus for communicating data in a wireless communications network, comprising:

means for transmitting a beacon to a station, the beacon comprising a Wi-Fi Protected Access II pre-shared key (WPA2-PSK) authentication type;

means for receiving an authentication request from the station, the authentication request comprising the WPA2-PSK authentication type and a first secure attribute exchange (SAE) information element, the means for transmitting further comprising means for transmitting an authentication response to the station, the authentication response comprising the WPA2-PSK authentication type and the first SAE information element; and means for generating a pairwise master key (PMK) identifier based on the first SAE information element, the means for receiving further comprising means for receiving an association request from the station after generation of the PMK identifier, the association request comprising a key confirmation derived from the PMK identifier and a second SAE information element, the means for transmitting further comprising means for transmitting an association response to the station in response to reception of the association request, the association response comprising the key confirmation and the second SAE information element.

8. The apparatus of claim 7, the authentication request further comprising a station nonce.

9. The apparatus of claim 7, the authentication response further comprising an access point nonce.

10. The apparatus of claim 7, the association request further comprising an Internet Protocol (IP) address request.

11. The apparatus of claim 7, the association response further comprising an Internet Protocol (IP) address response.

12. The apparatus of claim 7, the WPA2-PSK authentication type comprising fast initial link setup secure attribute exchange (FILS-SAE).

13. A method for communicating data in a wireless communications network, comprising:

transmitting a beacon to a station, the beacon comprising a Wi-Fi Protected Access II pre-shared key (WPA2-PSK) authentication type;

receiving an authentication request from the station, the authentication request comprising the WPA2-PSK authentication type, a first secure attribute exchange (SAE) information element, and a station nonce;

transmitting an authentication response to the station, the authentication response comprising the WPA2-PSK authentication type, the first SAE information element, and an access point nonce;

generating a pairwise master key (PMK) identifier based on the first SAE information element;

receiving an association request from the station after generation of the PMK identifier, the association request comprising a key confirmation derived from the PMK identifier and a second SAE information element; and transmitting an association response to the station in response to receiving the association request, the association response comprising the key confirmation and the second SAE information element.

14. The method of claim 13, the key confirmation being derived from the PMK identifier, the station nonce, and the access point nonce.

15. The method of claim 13, the association request further comprising an Internet Protocol (IP) address request.

16. The method of claim 13, the association response further comprising an Internet Protocol (IP) address response.

17. The method of claim 13, the WPA2-PSK authentication type comprising fast initial link setup secure attribute exchange (FILS-SAE).

18. An apparatus for communicating data in a wireless communications network, comprising:

a wireless transmitter configured to transmit a beacon to a station, the beacon comprising a Wi-Fi Protected Access II pre-shared key (WPA2-PSK) authentication type;

a wireless receiver configured to receive an authentication request from the station, the authentication request comprising the WPA2-PSK authentication type, a first secure attribute exchange (SAE) information element, and a station nonce, the wireless transmitter further configured to transmit an authentication response to the station, the authentication response comprising the WPA2-PSK authentication type, the first SAE information element, and an access point nonce; and a processor configured to generate a pairwise master key (PMK) identifier based on the first SAE information element, the wireless receiver further configured to receive an association request from the station after generation of the PMK identifier, the association request comprising a key confirmation derived from the PMK identifier and a second SAE information element, the wireless transmitter further configured to transmit an association response to the station in response to reception of the association request, the association response comprising the key confirmation and the second SAE information element.

19. The apparatus of claim 18, the key confirmation being derived from the PMK identifier, the station nonce, and the access point nonce.

20. The apparatus of claim 18, the association request further comprising an Internet Protocol (IP) address request.

21. The apparatus of claim 18, the association response further comprising an Internet Protocol (IP) address response.

22. The apparatus of claim 18, the WPA2-PSK authentication type comprising fast initial link setup secure attribute exchange (FILS-SAE).

* * * * *